Nov. 1, 1955     R. L. MILLS ET AL     2,722,605
BALANCED PHASE DISCRIMINATOR
Filed Jan. 7, 1953

ROBERT L. MILLS
FRANK J. McDONAL
INVENTORS

BY D. Carl Richards
ATTORNEY

United States Patent Office 2,722,605
Patented Nov. 1, 1955

2,722,605

BALANCED PHASE DISCRIMINATOR

Robert L. Mills and Frank J. McDonal, Dallas, Tex., assignors, by mesne assignments, to Socony Mobil Oil Company, Inc., a corporation of New York Application January 7, 1953, Serial No. 330,121

5 Claims. (Cl. 250—27)

This invention relates to phase discriminators and more particularly to the provision of a phase discriminator having a balanced-to-ground input and a single-ended output. A further aspect of the invention relates to the provision of such a discriminator having a full-wave rectified output.

In many applications it is necessary to eliminate the effects of stray capacities on the input side of a discriminator that otherwise introduce error functions into the discriminator output, particularly where high accuracy is desired. Further, it is often desirable that the output be of a single-ended character for application to conventional sensing circuits and that it be characterized by full-wave rectification in order to obtain a maximum output.

In accordance with the present invention, a discriminator network is provided in which a first voltage is applied across a first diagonal of a bridge in which a pair of adjacent arms connected in series between the extremities of said diagonal are each comprised of a source of reference voltage, a unilaterally conductive unit and an impedance. An output impedance is connected across the second diagonal of the bridge and is grounded at a central point on the input arms of the bridge to provide an output voltage for transmisison to associated circuits.

In a more specific aspect of the invention, the discriminator network comprises a series circuit including the secondary winding of a first transformer which is connected at a central point to a reference point, the secondary winding of a second transformer, a rectifier, a center tapped impedance, a second rectifier polarized the same as the first rectifier and the secondary of a third transformer. An output impedance is connected between the center tap of the impedance and to said reference point. A first signal source is then connected to the primary winding of the first of the transformers to produce a first voltage in the series circuit. A reference voltage source is connected to the primary windings of the second and third transformers in such polarities to produce in the series circuit a second and a third voltage which are instantaneously additive and are of opposite polarity across said output impedance.

For a further understanding of the invention, reference may now be had to the following description taken in conjunction with the accompanying drawings in which.

Figure 1:
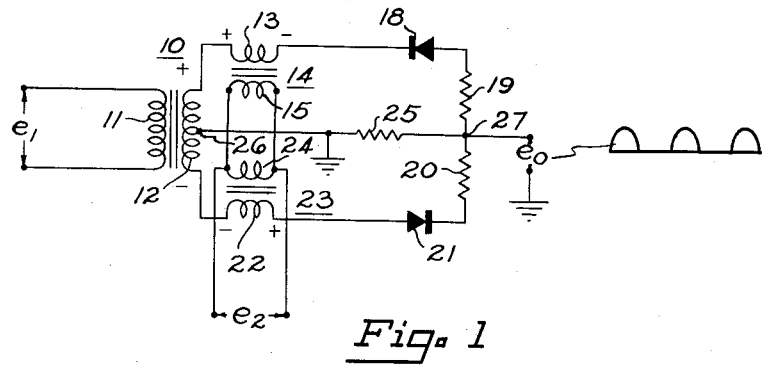
Fig. 1 is a circuit diagram of a half-wave rectifying phase discriminator.

Referring now to Fig. 1, a transformer 10 is provided with a primary winding 11 and a secondary winding 12. A first voltage $e_1$ is applied to the input terminals on the primary winding 11. The secondary winding 12 is connected in and forms a part of a circuit which includes the secondary winding 13 of a second transformer 14, a rectifier 18, a center tapped impedance network comprising impedances 19 and 20, a second rectifier 21, and the secondary winding 22 of a third transformer 23. A load resistance 25 is connected between the center tap 26 and the juncture 27 between the impedances 19 and 20. Center tap 26 is connected to ground. By this means the voltages induced in winding 12 are at all points in the winding balanced to ground so that stray capacities produce equal and opposite effects in the network and thus cancel themselves.

A reference voltage $e_2$ is applied to the primary winding 24 of transformer 23 and to the primary winding 15 of transformer 14. The instantaneous polarities of the voltages induced in secondary windings 13 and 22 are additive in the series circuit, which includes both of the impedances 19 and 20, but tend to cause current flow in opposite directions through the load impedance 25. Voltages thus induced in opposite arms of the phase discriminator are equal and opposite in their effect in the output circuit. Additionally, both voltages are balanced to ground. The phase relationships of voltages $e_1$ and $e_2$ control the conductivities of the rectifiers 18 and 21. Through operation of the circuit as hereinafter described, the output voltage $e_0$ is proportional to the magnitude of the voltage $e_1$ and the phase angle between voltage $e_1$ and voltage $e_2$.

The wave form of voltage $e_0$ is shown for the condition when voltages $e_1$ and $e_2$ are in phase. When out of phase, there is merely a reversal in sign of the half-wave rectified pulses. Absent are components otherwise present by reason of unbalanced circuit relationships in the circuit. In general applications, such components may be tolerated, but in many precision measuring systems would be excessive as to render them intolerable. In accordance with the present invention, there is symmetry throughout the circuit. At the same time the output circuit including load resistor 25 is single ended.

Figure 2:
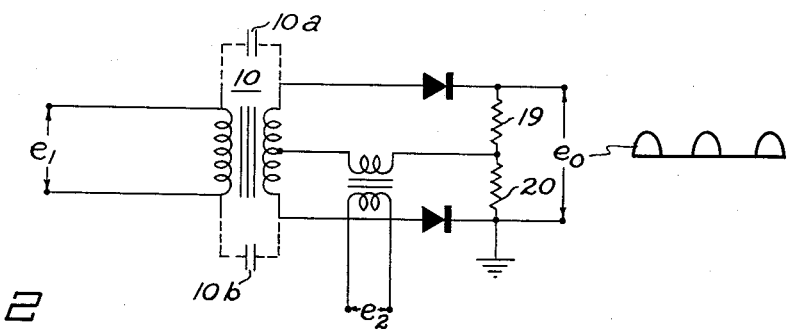
Fig. 2 is a circuit diagram of a conventional phase discriminator.

The advantages of the foregoing circuit can be readily seen when a conventional phase discriminator illustrated in Fig. 2 is considered. Where consistent, like parts have been given the same reference characters as in Fig. 1. The input transformer 10 necessarily has inherent stray capacities 10a and 10b. If the output from the rectifier is taken from across impedances 19 and 20, the relative effect of the stray capacities 10a and 10b is substantially different for alternate half cycles of the input voltage of $e_1$. It is apparent that, in terms of a bridge network nomenclature, the system of Fig. 2 applies a first voltage across a first diagonal (the secondary winding of transformer 10) and applies a reference voltage $e_2$ across a second diagonal and then obtains an output across but a portion of the first diagonal. In applicants' system shown in Fig. 1 the output is taken across the entire second diagonal, and the reference voltage is inserted into the network across a pair of impedances each of which forms but a portion of the respective arms connected in series across the first diagonal.

Figure 3:
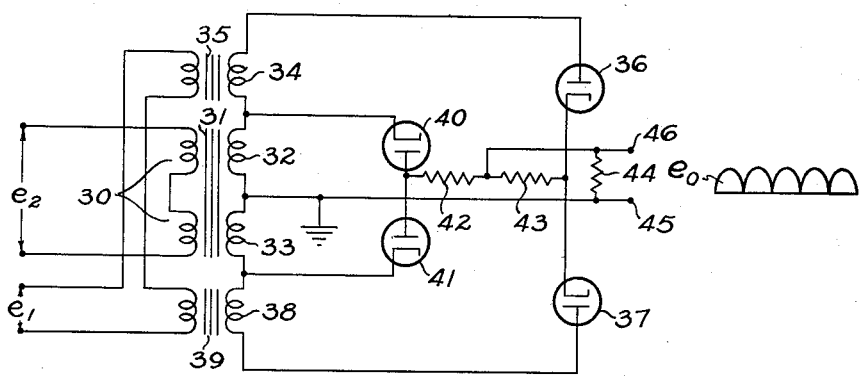
Fig. 3 is a circuit diagram of a full-wave rectifying phase discriminator.

Referring now to Fig. 3, a full-wave rectified output voltage is obtained while maintaining the balanced input single ended output character of the operation. A reference voltage $e_2$ is applied to the primary windings 30 of a transformer 31 whose secondary windings 32 and 33 are connected in series in a first series circuit which comprises the following elements: the secondary winding 34 of a transformer 35, a first rectifier 36 whose cathode is connected to the cathode of a second rectifier 37, whose anode is connected through the secondary winding 38 of transformer 39 to the secondary winding 33 of transformer 31. Windings 32 and 33 are also connected in a second series circuit which includes rectifiers 40 and 41 poled opposite each other in the second series circuit and respectively opposite rectifiers 36 and 37 in the first series circuit. A center tapped network including impedances 42 and 43 is connected to the juncture between rectifiers 40 and 41 and to the juncture between rectifiers 36 and 37. The center tap between secondary windings 32 and 33 is connected to ground which serves as one output terminal 45. A load resistance 44 is connected between the ground terminal 45 and the central point between impedances 42 and 43.

The signal voltage is applied to the primary windings of transformers 35 and 39 to produce across resistor 44 a full-wave rectified voltage proportional to the magnitude of voltage $e_1$ and the phase angle between voltages $e_1$ and $e_2$.

The signal voltage is applied to the primary windings of transformers 35 and 39 to produce across resistor 44 a full-wave rectified voltage proportional to the magnitude of the input voltage $e_1$ and the cosine of the phase angle between the voltages $e_1$ and $e_2$.

It will now be seen that a center tapped inductance forms adjacent arms of a four armed bridge network. Means are provided for applying a signal to the inductance to produce current flow in a load impedance connected across the diagonal of the bridge opposite the inductance and connected at one end to the inductance center tap. Reference voltages are applied to each of the arms of the bridge opposite the inductance of the same magnitude and of the same instantaneous polarity. Each of the latter arms includes rectifying means poled opposite each other with reference to the output circuit. The center tap on the inductance and one terminal of the load impedance are connected to ground and the output across the load impedance is then dependent only upon the magnitude of the signal voltage and its phase relation to the reference voltage.

While the invention has been described in connection with certain modifications thereof, it will now be apparent that further modifications may now suggest themselves to those skilled in the art and it is intended to cover such modifications as fall within the scope of the appended claims.

What is claimed is:

1. A four arm discriminator bridge network which comprises a transformer having a center tapped secondary winding forming first and second adjacent arms of said bridge network, means for applying a signal to said transformer to induce a voltage in said secondary winding, a direct connection between the center tap on said secondary winding and ground whereby signal voltages in said bridge are due substantially entirely to induction, a load impedance connected across the diagonal of said bridge opposite the diagonal spanned by said secondary winding and connected at one end to said center tap, means for applying a reference voltage to the third and fourth arms of said bridge and of the same instantaneous polarity, a diode in said third arm for limiting current therefrom through said load impedance to a first direction, and a diode in said fourth arm poled opposite the first diode with reference to said center tap for limiting current therefrom through said load impedance to a second direction whereby voltages across said impedance are dependent only upon the magnitude of said signal and its phase relation to said reference voltage.

2. A discriminator network having a balanced input and a single ended output which comprises a series circuit including the secondary of a center tapped transformer, the secondary of a second transformer, a rectifier, an impedance having a center tap, a second rectifier poled the same as the first rectifier, and the secondary of a third transformer, an output impedance connected between said center tap and the central point on said first transformer secondary, a ground connection to the center tap on said first transformer secondary, means including a primary winding on said first transformer for producing in said series circuit a first voltage, and means including primary windings on said second and third transformers for producing in said series circuit a second and a third voltage having instantaneous polarities additive in said series circuit.

3. A discriminator network which comprises a center tapped inductance forming two adjacent arms of a four arm bridge network, means for applying a signal to said inductance, a load impedance connected across the diagonal of said bridge opposite said inductance and connected at one end to the inductance center tap, means for applying reference voltages of the same magnitude and of the same instantaneous polarity to each of two arms of the bridge symmetrical to said center tap opposite said inductance, rectifying means in each of said last named arms poled for conductivity in opposite directions through said load impedance, and means connecting said center tap to ground whereby the output across said impedance is dependent only upon the magnitude of said signal and its phase relation to said reference voltage.

4. A phase discriminator network for producing from an input which is balanced relative to two input voltages a single ended full wave rectified output voltage which comprises a first series circuit which includes a first inductance, a second inductance, a pair of rectifiers connected in tandem with opposed polarities, and a third inductance, a second series circuit including said first inductance and a second pair of rectifiers connected in tandem with opposed polarities relative to each other and respectivly opposite the polarities of the rectifiers in said first series circuit with respect to said first inductance, an impedance having a center tap connected between the common juncture of said first pair of rectifiers and the common juncture between the second pair of rectifiers, an output impedance connected between said center tap and the midpoint of said first inductance, means for inducing a voltage in said first inductance instantaneously proportional to the first of said two input voltages, and means for inducing in said second inductance and in said third inductance alternating voltages equal in magnitude to each other and proportional to the instantaneous magnitude of the second of said input voltages with the voltages induced in said second and third inductances having the same instantaneous polarities with reference to said first series circuits.

5. A phase discriminator network for producing from an input which is balanced relative to two input voltages a single ended full wave rectified output voltage which comprises a first current loop including three inductances connected in series and completed by a pair of rectifiers connected in tandem with a common junction between the cathode of one rectifier and the anode of the other rectifier, a second current loop which includes the intermediate inductance of said three inductances and a second pair of rectifiers connected in tandem with a common junction between the cathode of one rectifier and the anode of the other rectifier, said second pair of rectifiers being respectively connected with polarities opposite the polarities of the first pair of rectifiers with reference to said intermediate inductance, an impedance having a center tap connected between said common junctions, an output impedance connected between said center tap and the midpoint of said intermediate inductance, means for inducing a voltage in said intermediate inductance instantaneously proportional to the first of said two input voltages, and means for inducing in the other two inductances alternating voltages equal in magnitude to each other and proportional to the instantaneous magnitude of the second of said input voltages with the voltages induced in said other two inductances having the same instantaneous polarities with reference to said first current loop.

References Cited in the file of this patent

UNITED STATES PATENTS

| Number | Name | Date |
|---|---|---|
| 2,158,276 | Crosby | May 16, 1939 |
| 2,454,265 | Jaynes | Nov. 16, 1948 |
| 2,539,818 | Dome | Jan. 30, 1951 |
| 2,579,286 | Adamson | Dec. 18, 1951 |
| 2,620,439 | Dome | Dec. 2, 1952 |
| 2,634,367 | Joseph | Apr. 7, 1953 |